(12) United States Patent
Hou

(10) Patent No.: US 10,551,887 B2
(45) Date of Patent: Feb. 4, 2020

(54) CONTROL DEVICE FOR FAN STATE

(71) Applicant: Nzxt Inc., City of Industry, CA (US)

(72) Inventor: Johnny Hou, City of Industry, CA (US)

(73) Assignee: NZXT INC., City of Industry, CA (US)

( * ) Notice: Subject to any disclaimer, the term of this patent is extended or adjusted under 35 U.S.C. 154(b) by 165 days.

(21) Appl. No.: 15/613,814

(22) Filed: Jun. 5, 2017

(65) Prior Publication Data
US 2018/0348830 A1 Dec. 6, 2018

(51) Int. Cl.
G06F 1/20 (2006.01)
G06F 16/903 (2019.01)

(52) U.S. Cl.
CPC ........ G06F 1/206 (2013.01); G06F 16/90335 (2019.01)

(58) Field of Classification Search
None
See application file for complete search history.

(56) References Cited

U.S. PATENT DOCUMENTS

| 9,083,265 B1* | 7/2015 | Maroney | H02P 5/50 |
| 2004/0228091 A1* | 11/2004 | Miyairi | H05K 7/20209 361/695 |
| 2004/0264125 A1* | 12/2004 | Cheng | G06F 1/206 361/679.48 |
| 2005/0030171 A1* | 2/2005 | Liu | G06F 1/206 340/500 |
| 2005/0174737 A1* | 8/2005 | Meir | G06F 1/20 361/697 |
| 2005/0212781 A1* | 9/2005 | Clapper | G06F 1/181 345/184 |
| 2006/0108962 A1* | 5/2006 | Murray | G05B 13/024 318/610 |
| 2007/0027580 A1* | 2/2007 | Ligtenberg | G05D 23/19 700/300 |
| 2007/0124574 A1* | 5/2007 | Goldberg | G06F 1/206 713/100 |
| 2007/0153443 A1* | 7/2007 | Lyons | F04D 27/001 361/103 |
| 2008/0181433 A1* | 7/2008 | Thomas | G10K 11/178 381/94.5 |

(Continued)

Primary Examiner — Thomas C Lee
Assistant Examiner — Gary Collins
(74) Attorney, Agent, or Firm — Muncy, Geissler, Olds & Lowe, P.C.

(57) ABSTRACT

A control device for fan state includes fan connectors arranged on a substrate and connected with at least one fan. The substrate and the fan are arranged in a case of a computer. The substrate is provided with at least one communication port, at least one microphone and a microcontroller. The communication port receives temperature signals transmitted by the computer. The microphone receives volume signals within the case. A microcontroller is electrically connected with the fan connectors, the communication port and the microphone. After the microcontroller receives the temperature signal and the volume signal, the microcontroller uses them to determine whether a value of the temperature signal or the volume signal is larger than its given value. If the answer is yes, the microcontroller controls a rotational speed of the fan, turns off the fan, or provides control items displayed on a screen of the computer to choose.

9 Claims, 3 Drawing Sheets

(56) References Cited

U.S. PATENT DOCUMENTS

| | | | | |
|---|---|---|---|---|
| 2008/0269920 A1* | 10/2008 | Langgood | ............... | G06F 1/206 700/34 |
| 2009/0002939 A1* | 1/2009 | Baugh | ................. | G06F 1/206 361/679.48 |
| 2009/0080671 A1* | 3/2009 | Kellner | ................. | G06F 1/206 381/73.1 |
| 2009/0092261 A1* | 4/2009 | Bard | ................. | G06F 1/206 381/71.1 |
| 2010/0079094 A1* | 4/2010 | Beltman | ................. | G06F 1/206 318/460 |
| 2013/0037620 A1* | 2/2013 | Aryanfar | ................. | G06F 1/20 236/49.3 |
| 2013/0079933 A1* | 3/2013 | Tan | ................. | G06F 1/20 700/280 |
| 2013/0144457 A1* | 6/2013 | Cong | ................. | G06F 1/206 700/299 |
| 2013/0229127 A1* | 9/2013 | Mueller | ................. | H05B 41/36 315/225 |
| 2013/0258574 A1* | 10/2013 | Pamley | ................. | G06F 1/206 361/679.31 |
| 2013/0332159 A1* | 12/2013 | Federighi | ................. | G10L 15/26 704/235 |
| 2014/0160746 A1* | 6/2014 | Ng | ................. | F21V 29/002 362/235 |
| 2015/0105910 A1* | 4/2015 | Zou | ................. | H05K 7/20836 700/275 |
| 2015/0110283 A1* | 4/2015 | Cheng | ................. | G06F 1/20 381/71.1 |
| 2015/0198957 A1* | 7/2015 | Montero | ................. | G06F 1/206 700/300 |
| 2015/0290533 A1* | 10/2015 | Cerqueira | ............. | A63F 13/215 463/35 |
| 2017/0314777 A1* | 11/2017 | Lai | ................. | F21V 33/0096 |
| 2019/0008074 A1* | 1/2019 | Chen | ................. | F04D 27/004 |

* cited by examiner

CONTROL DEVICE FOR FAN STATE

BACKGROUND OF THE INVENTION

Field of the Invention

The present invention relates to a fan controller, particularly to a control device for fan state.

Description of the Related Art

A computer case is provided with at least one fan therein. Firstly, a fan is built in a power supply. A central processor on a motherboard and a graphics processing unit of a video card compute at a high speed to increase their temperature. Thus, they require fans to dissipate heat, and heat-dissipation fans are usually installed on the motherboard and the high-order video card. The noise source in the case mainly comes from the fan, the motherboard and the graphics processing unit.

Only three fans may not achieve the purpose of heat-dissipation. As a result, more fans are required. However, the motherboard has only one or two fan connectors. If the fan connectors have been connected with fans of the motherboard and the video card, there are no connectors connected with more fans. Fan controllers are additionally bought and installed on the motherboard. Instead of connecting with the motherboard, more fans electrically connect with the fan controllers. Nevertheless, if a plurality of fan controllers is connected, the fan controllers cannot monitor each other's data, such as types and rotational speeds. Besides, the fan controller also cannot monitor data of the fan connected with the motherboard.

To overcome the abovementioned problems, the present invention provides a control device for fan state, so as to solve the afore-mentioned problems of the prior art.

SUMMARY OF THE INVENTION

A primary objective of the present invention is to provide a control device for fan state, which connects with a microphone to detect volume of noise, receives temperature within a case detected by a computer or a motherboard and uses the temperature and the volume to control rotational speeds of several fans and switch on or off the fans, thereby adjusting the temperature and the volume. Conventional fan controllers are difficult to control several fans at the same time. The fan controllers merely adjust a heat-dissipation function, but cannot adjust rotational speeds of the fans according to noise caused by the fans.

Another objective of the present invention is to provide a control device for fan state, which uses an audio cable as an extension cable connected with an audio connector of a substrate and a microphone, whereby the microphone is more widely located. When the control device for fan state is arranged on any position of a case, the microphone can be installed on the best position for receiving sound. Thus, a range of installing the microphone is not limited.

Further objective of the present invention is to provide a control device for fan state, which connects with a motherboard or an independent substrate electrically connected with the motherboard, whereby a fan controller is more widely used without buying a specific motherboard. An existing motherboard is alternatively used.

To achieve the abovementioned objectives, the present invention provides a control device for fan state, which includes a plurality of fan connectors, at least one communication port, at least one microphone and at least one microcontroller arranged on a substrate. The fan connectors are connected with at least one fan, and the substrate and the fan are arranged in a case of a computer. The communication port is arranged on the substrate, electrically connected with the computer, communicates with the computer, and receives a plurality of temperature signals transmitted by the computer. Software programs installed in the operation system of the computer communicates with the microcontroller through the communication port. The microphone is arranged on the substrate or electrically connected with the substrate, and the microphone measures a plurality of volume signals within the case. The microcontroller has a database therein, and is arranged on the substrate and electrically connected with the plurality of fan connectors, the communication port and the microphone. After the microcontroller receives the temperature signal and the volume signal, the microcontroller compares them with the database, so as to determine whether a value of the temperature signal or the volume signal is larger than its given value. When the value of the temperature signal or the volume signal is larger than its given value, the microcontroller generates a control command to control a rotational speed of the fan or turn off the fan, or provides a plurality of control items displayed on a screen of the computer to choose.

In an embodiment of the present invention, the substrate is a motherboard or an independent substrate which is independent to the motherboard.

In an embodiment of the present invention, when the substrate is the independent substrate, the substrate is electrically connected with the motherboard.

In an embodiment of the present invention, the temperature signal is detected by temperature detection software or by the motherboard detecting temperature of at least one central processor (CPU) and at least one graphics processing unit (GPU) on the motherboard.

In an embodiment of the present invention, when the substrate is the independent substrate, the substrate is further provided with a power connector which is electrically connected with a power supply within the case through a power cable, and the power supply provides the substrate with power.

In an embodiment of the present invention, the control device for fan state further comprises at least one expanded connector arranged on the substrate and connected with at least one light bar.

In an embodiment of the present invention, the microcontroller switches on or off the at least one light bar according to the temperature signal.

In an embodiment of the present invention, the substrate further comprises at least one audio connector which is connected with the microphone.

In an embodiment of the present invention, the database further records temperature and volume caused by amounts, types and rotational speeds of different fans and heat-dissipation structures of different central processors.

In an embodiment of the present invention, the control items further comprises an item of lowest temperature, an item of lowest volume and an item of balance between temperature and volume.

In an embodiment of the present invention, the microphone is a miniature microphone, and the communication port is a USB 2.0 port, a USB 3.0 port or a micro USB port.

Below, the embodiments are described in detail in cooperation with the drawings to make easily understood the technical contents, characteristics and accomplishments of the present invention.

DETAILED DESCRIPTION OF THE INVENTION

Figure 1:
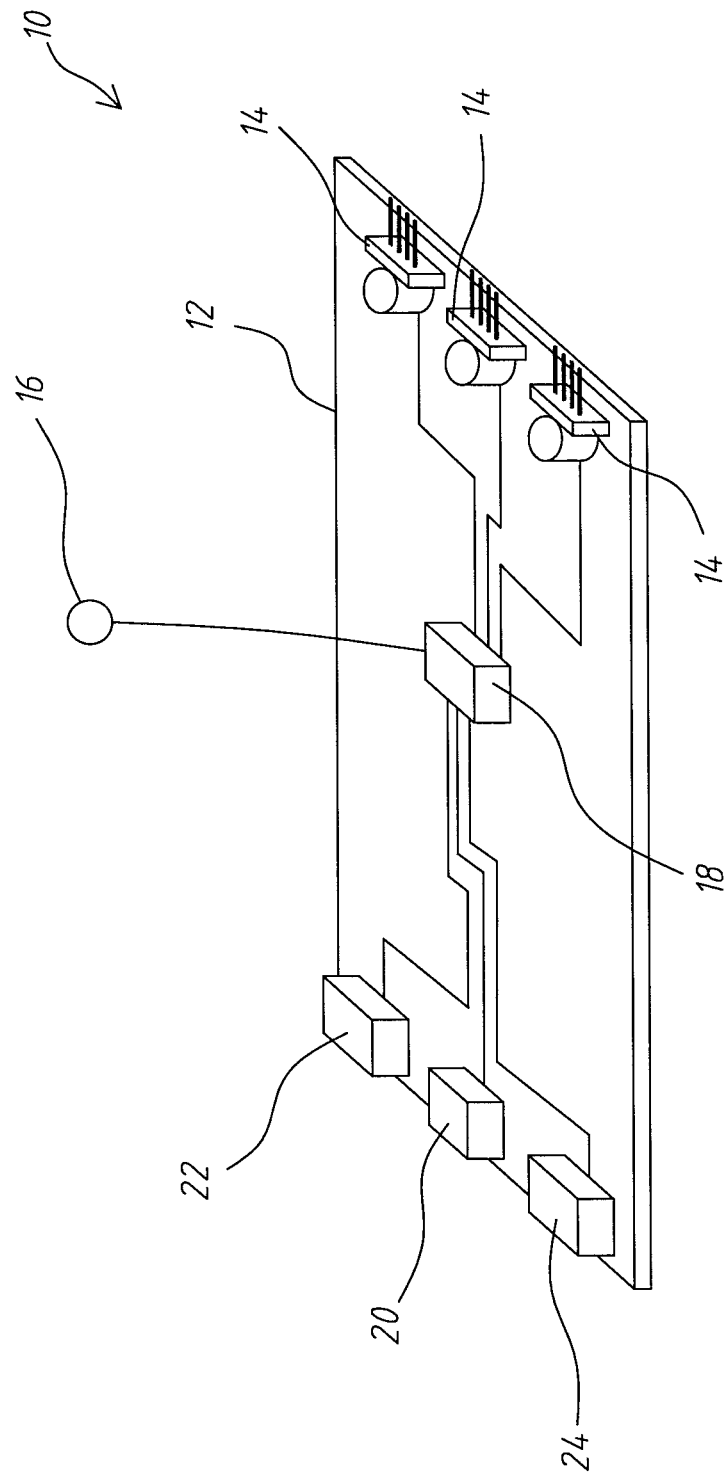
FIG. 1 is a diagram schematically showing a control device for fan state according to an embodiment of the present invention.

The present invention provides a control device for fan state, which is installed in a case of a computer, and the control device for fan state uses temperature and volume (dB) within the case to control rotational speeds of fans and switch on or off the fans, thereby adjusting the temperature and the volume. Refer to FIG. 1, which is a diagram schematically showing a control device for fan state according to an embodiment of the present invention.

In the embodiment, the control device 10 for fan state comprises a plurality of fan connectors 14, at least one microphone 16, at least one microcontroller 18 and at least one communication port 20, wherein the fan connectors 14, the microcontroller 18 and the communication port 20 are arranged on a substrate 12, and the microphone 16 is arranged on the substrate 12 or electrically connected with the substrate 12. In FIG. 1, the amount of the fan connectors 14 are three, and the amounts of the microphone 16, the microcontroller 18 and the communication port 20 are respectively one, one and one. The fan connectors 14 are connected with at least one fan (not shown). The fan is a heat-dissipation fan arranged in a case of a computer, but a type of the fan is not limited. Thus, the fan connectors 14 belong to universal specifications of fans. The fan and the substrate 12 are arranged in a case (not shown) of a computer (not shown). The communication port 20 is electrically connected with the computer and communicates with the computer. The communication port 20 receives temperature signals transmitted by the computer. Particularly, software programs installed in the operation system of the computer communicates with the microcontroller 18 through the communication port 20. The communication port 20 is a USB 2.0 port, a USB 3.0 port or a micro USB port. The microphone 16 is a miniature microphone that measures volume signals within the case. The noise within the case is mainly caused by fans. The microphone 16 is like a decibelmeter that can detect the decibel of the volume within the case. Alternatively, the decibel is replaced with another unit. The microcontroller 18 is electrically connected with the fan connectors 14, the communication port 20 and the microphone 16. The microcontroller 18 has a database (not shown) therein. The database records temperature and volume caused by amounts, types and rotational speeds of different fans and heat-dissipation structures of different central processors, and sets given values for temperature and volume. After the microcontroller 18 receives the temperature signal and the volume signal, the microcontroller 18 compares them with the database, so as to determine whether a value of the temperature signal or the volume signal is larger than its given value. When the value of the temperature signal or the volume signal is larger than its the given value, the microcontroller 18 generates a control command to control a rotational speed of the at least one fan or turn off the at least one fan, or provides a plurality of control items displayed on a screen (not shown) of the computer to choose.

In the present invention, the substrate 12 is installed on and electrically connected with a motherboard (not shown). Alternatively, the substrate 12 is a motherboard. When the substrate 12 is a motherboard, the control device 10 for fan state is a module arranged on the motherboard. In FIG. 1, the substrate 12 is an independent substrate which is independent to the motherboard. Thus, a power connector 22 is required. The power connector 22 is a SATA connector or a Molex connector. The power connector 22 is electrically connected with a power supply (not shown) within the case through a power cable (not shown). A terminal of the power cable connected with the power connector 22 has a SATA connector or a Molex connector, and the other terminal of the power cable has a cylinder DC connector. The power supply provides the substrate 12 with power, so that the fan connectors 14, the microcontroller 18 and the communication port 20 arranged on the substrate 12 operate. When the substrate 12 is an independent substrate, the communication port 20 is electrically connected with the motherboard to receive the signals of the computer. When the substrate 12 is a motherboard, the communication port 20 is electrically connected with a processor (not shown) outside the control device 10 for fan state. The processor is used to detect and calculate the temperature of the motherboard. As a result, the communication port 20 connected with the processor can receive the temperature signal.

Particularly, temperature detection software is installed in the computer, and the temperature detection software is used to detect the temperature signals (temperature values) of at least one central processor and at least one graphics processing unit arranged on the motherboard. Alternatively, some motherboards have functions of detecting temperature of central processors and graphics processing units in the market. Thus, the motherboard detects the temperature signals and then transmits them to the microcontroller 18 through the communication port 20.

The database is established according to practical tests. The database records temperature and volume caused by amounts and rotational speeds of different fans. From test processes, it is known that which one of fan arrangements causes the highest volume or the lowest volume, and that which one of fan arrangements causes the highest temperature or the lowest temperature of a CPU and a graphics processing unit (GPU), and that which one of fan arrangements causes the best volume and temperature (having both of volume and temperature, and temperature and volume are not high). The graphics processing unit (GPU) can be a display card. For software, the data (provided by manufacturers) of the CPU and the GPU are obtained from the public and existing database. Thus, the temperature variations of the CPU and the GPU are detected. Besides, different arrangement within a case (traditional arrangement or upside-down arrangement), heat-dissipation structures (air-cooled or water-cooled) of the CPU and specifications (public version of Blower Fan or non-public version of Axial Fan) of fans of video cards are factors to affect volume and temperature. Accordingly, the database is established by testing arrangements of different components, whereby everyone establishes a database according to his/her internal arrangement of a case when using the control device for fan state of the present invention.

When a user uses the control device for fan state, the corresponding software program is installed in the database that has been established. The software program reports arrangement of a case, a type of a heat sink of a CPU, a type of a fan of a GPU, positions of installing fans and either of wind inlets or wind outlets used by the user to the user. When the arrangement used by the user is determined, the software provides several items corresponding to this arrangement for the user, and the items have to include an item of lowest temperature, an item of lowest volume and an item of balance between temperature and volume. The user can choose one of the abovementioned items by himself/ herself. The software has a test program that can help users test different arrangement and obtain test results thereof, whereby the database is more completely established.

Continuing from the abovementioned description, the database further comprises the given value being a value of temperature or volume. When the value of the temperature or the volume is larger than its given value, the microcontroller 18 provides the control items including the item of lowest temperature, the item of lowest volume and the item of balance between temperature and volume displayed on a screen of the computer to choose. For example, when the temperature is larger than its given value, the item of lowest temperature is performed to make rotational speeds of all the fans maximum. When the volume is larger than its given value, the item of lowest volume is performed to make rotational speeds of all the fans minimum or switch off all the fans. When the computer does not perform the program with large computation, switching off all the fans is practical. The item of balance between temperature and volume is performed to switch off a half or a part of all the fans to reduce the volume caused by the fans. Simultaneously, the other fans still dissipate heat, so that the temperature is lower than its given value.

Continuing from the abovementioned description, the microcontroller 18 sets one of an item of lowest temperature, an item of lowest volume and an item of balance between temperature and volume as a given item, which is undertaken under the condition of the temperature or the volume larger than its given value. For example, when the temperature is larger than its given value, the item of lowest temperature is performed. When the volume is larger than its given value, the item of lowest volume is performed. Alternatively, the three items are displayed on the screen and the user can manually choose them. In addition to the three items, the user performs advance setting on the fans to change the arrangement of the fans in response to different situations.

Nowadays, in order to make a host beautiful, the case is provided with light bars to twinkle or emit light with different color. However, the lighting effect of the light bars is achieved by using the computer to transmit control signals. As a result, the light bar is connected with the motherboard through a signal cable. If the motherboard does not have an additional connector, the motherboard cannot be connected with the light bar. Thus, the control device 10 for fan state further comprises at least one expanded connector 24 arranged on the substrate 12 and connected with at least one light bar (not shown). The microcontroller 18 receives a control signal for the light bar to control the lighting effect of the light bar. In addition to switching the fans, the microcontroller 18 switches on or off the light bar according to the temperature signal. For example, when the motherboard overheats and the rotational speeds of all the fans that have been adjusted to maximum cannot decrease the temperature to below its given value, switching off the light bar is the best solution since the CPU and the GPU cannot be switched off. The microcontroller 18 does not restart the light bar until the temperature is decreased and greatly lower than its given value.

Figure 2:
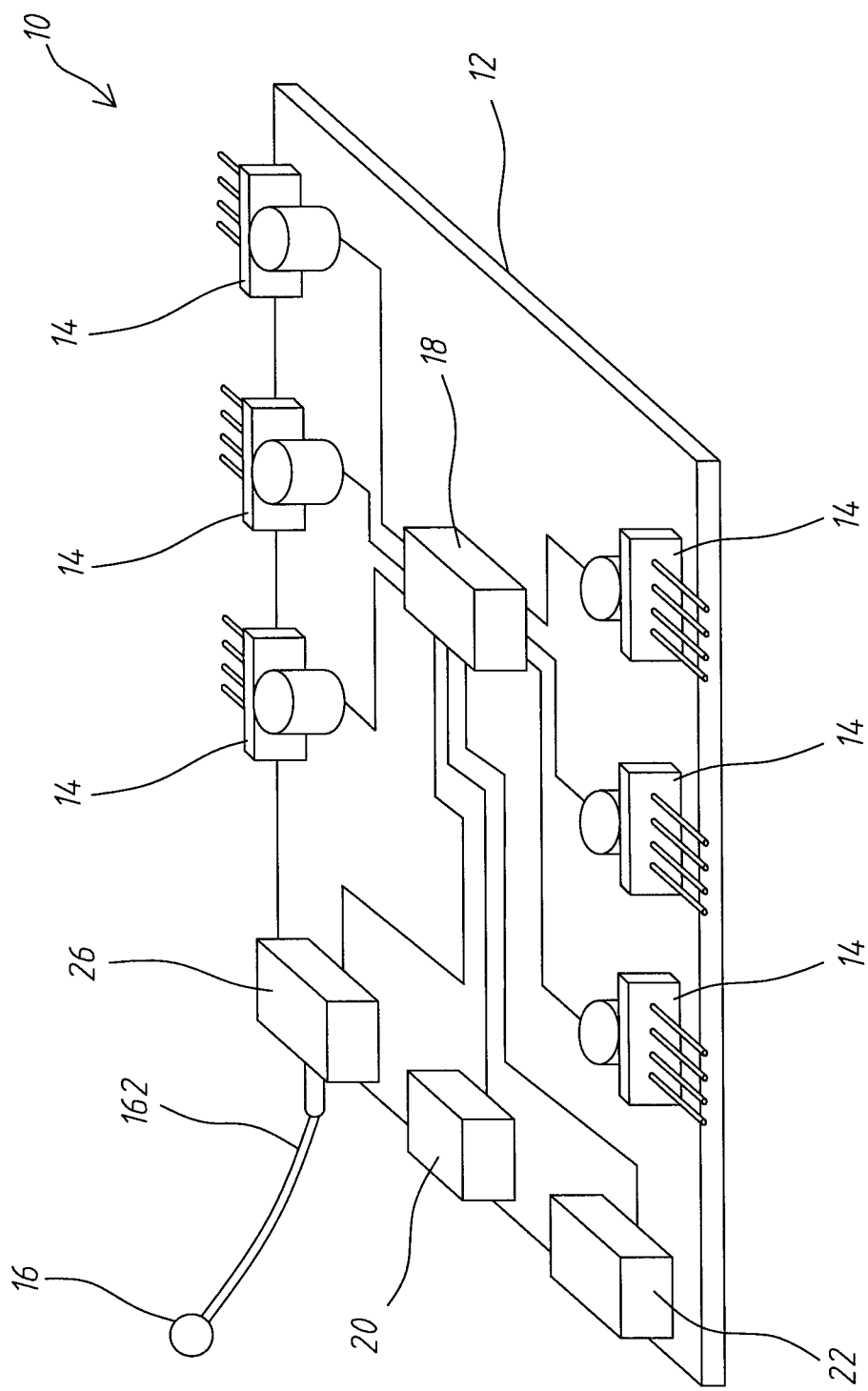
FIG. 2 is a diagram schematically showing a control device for fan state according to another embodiment of the present invention.

FIG. 2 is a diagram schematically showing a control device 10 for fan state according to another embodiment of the present invention. The control device 10 for fan state comprises a plurality of fan connectors 14, at least one microcontroller 18, at least one communication port 20 and a power connector 22 arranged on a substrate 12. In the embodiment, the substrate 12 is an independent substrate independent to a motherboard. Thus, the power connector 22 is electrically connected with a power supply within a case, and the power supply provides the substrate 12 with power. In the embodiment, there are six fan connectors 14 which are connected with at most six fans to achieve the best heat-dissipation effect. Since the substrate 12 may be arranged on any position of the case, the substrate 12 further comprises at least one audio connector 26 which is connected with the microphone 16, whereby the microphone 16 is arranged on the best sound-receiving position. In this way, the microphone 16 uses an audio cable to extend a distance between the microphone 16 and the substrate 12 and connect with the substrate 12. Thus, the sound-receiving effect of the microphone 16 cannot be limited and affected by the position of the substrate 12.

The connectors arranged on the substrate 12 are realized with slots or sockets, such as a power socket, expanded slots, and an audio socket.

Figure 3:
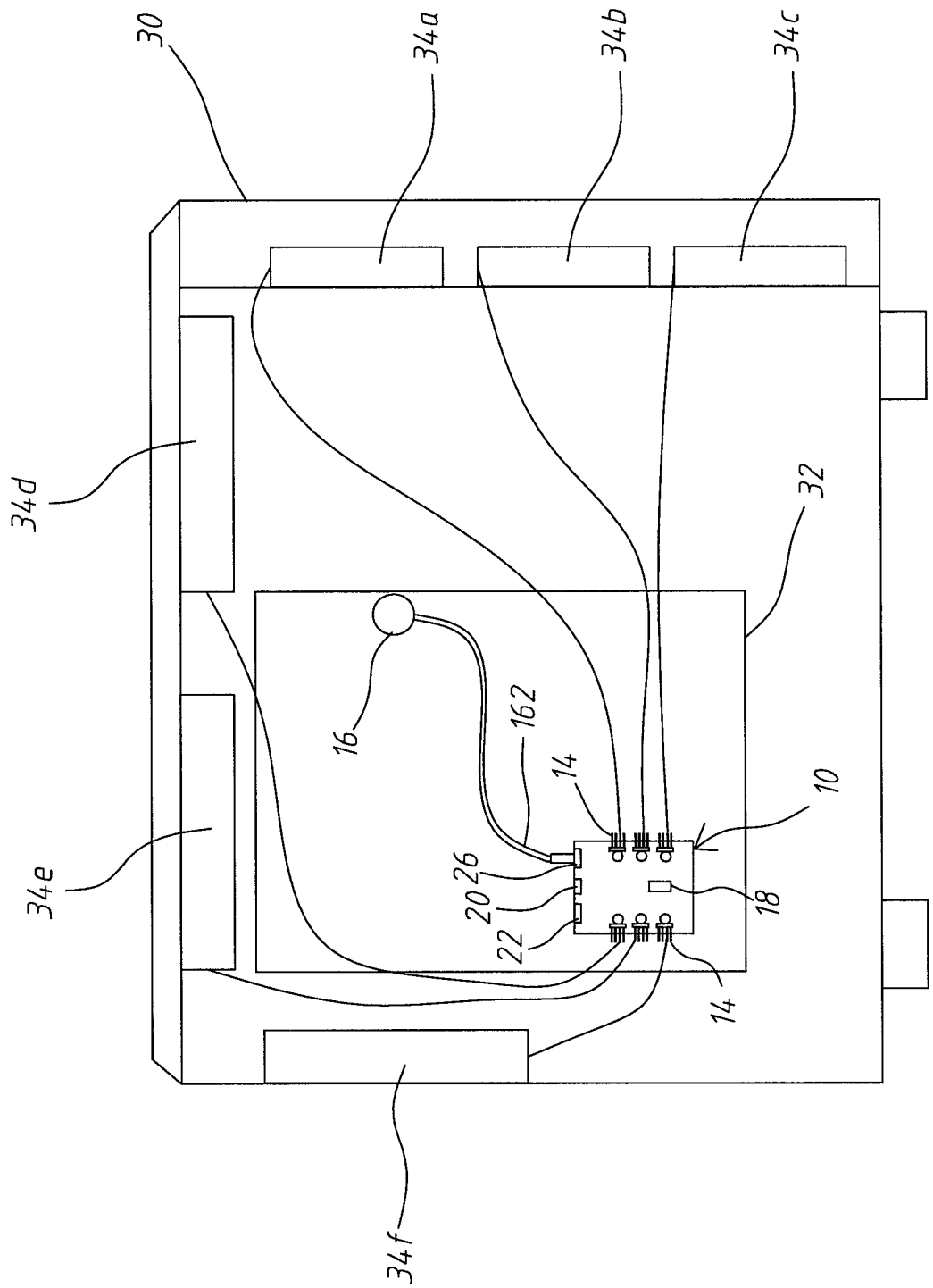
FIG. 3 is a diagram schematically showing a control device for fan state arranged in a case according to an embodiment of the present invention.

FIG. 3 is a diagram schematically showing a control device for fan state arranged in a case according to an embodiment of the present invention. A case 30 is provided with a motherboard 32 therein. A substrate of the control device 10 for fan state is an independent substrate, such as a video card connected with the motherboard 32. Alternatively, as shown in FIG. 3, the control device 10 for fan state is a control processing module (as denoted by a dash line) arranged on the motherboard 32, and no substrate is shown. The arrangement of the control device 10 for fan state is shown in FIG. 2. The control device 10 for fan state comprises six fan connectors 14, a microcontroller 18, a communication port 20, a power connector 22 and an audio connector 26. A microphone 16 is arranged at another end of the motherboard 32 and connected with the audio connector 26 through an audio cable 162 and transmits the detected volume signals to the microphone 18. The case 30 is provided with six fans 34a, 34b, 34c, 34d, 34e and 34f. The fans 34a, 34b and 34c are arranged at a front side of the case 30, and the fans 34d and 34e are arranged on the top of the case 30, and the fan 34f is arranged at a back side of the case 30. The fans 34a, 34b, 34c, 34d, 34e and 34f are respectively electrically connected with the fan connectors 14. The types, rotational speeds and noise decibel of the fans are different. The control device 10 for fan state can freely control the switching states and the rotational speeds of the fans 34a, 34b, 34c, 34d, 34e and 34f, as shown in Table 1. Table 1 shows temperature of CPU and temperature and volume of video card for six items A~F, which includes item B of lowest volume and item A of lowest temperature.

TABLE 1

| | Item (rotational speed of fan per min.) | | | | | |
|---|---|---|---|---|---|---|
| | A | B | C | D | E | F |
| Fan 34a | 1200 | 0 | 1000 | 800 | 1200 | 600 |
| Fan 34b | 1200 | 0 | 1000 | 800 | 1200 | 600 |
| Fan 34c | 1200 | 0 | 1000 | 800 | 1200 | 600 |
| Fan 34d | 1200 | 0 | 1000 | 800 | 0 | 1000 |
| Fan 34e | 1200 | 0 | 1000 | 800 | 0 | 1000 |
| Fan 34f | 1200 | 0 | 1000 | 800 | 1200 | 1000 |
| Temperature of CPU (° C.) | 55 | 70 | 57 | 59 | 57 | 58 |
| Temperature of video card (° C.) | 80 | 86 | 81 | 82 | 81 | 80 |
| Volume (dBA) | 77 | 54 | 72 | 65 | 66 | 64 |

In conclusion, the control device for fan state increases the amount of the connectable fans, and one control device for fan state can control several fans at the same time. In a conventional technology, one fan controller merely connects with one fan, which is different from the present invention. Besides, the conventional fan controller needs to know a position of each fan. The present invention does not need to know the position of each fan but knows the types and amount of the fans. One control device for fan state of the present invention not only connects with several fans, but also omits the step of obtaining the position of each fan. After obtaining the types and amount of the fans, the present invention can directly control the switching states and the rotational speeds of the fans to achieve high heat-dissipation effect and convenience and reduce the noise. These purposes are not achieved by the conventional fan controller.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A control device for fan state comprising:
    a plurality of fan connectors arranged on a substrate and connected with at least one fan, and said substrate and said at least one fan are arranged in a case of a computer;
    at least one communication port arranged on said substrate, electrically connected with said computer, communicating with said computer, and receiving a plurality of temperature signals transmitted by said computer;
    at least one microphone arranged on said substrate or electrically connected with said substrate, and said at least one microphone measures a plurality of volume signals within said case; and
    a microcontroller having a database therein, arranged on said substrate and electrically connected with said plurality of fan connectors, said at least one communication port and said at least one microphone, and after said microcontroller receives said temperature signal and said volume signal, said microcontroller compares them with said database, so as to determine whether a value of said temperature signal or said volume signal is larger than its given value, and when said value of said temperature signal or said volume signal is larger than its said given value, said microcontroller generates a control command to control a rotational speed of said at least one fan or turn off said at least one fan, or provides a plurality of control items displayed on a screen of said computer to choose;
    wherein said substrate is a motherboard or an independent substrate which is independent to said motherboard;
    wherein said control items further comprises an item of lowest temperature, an item of lowest volume and an item of balance between temperature and volume; and
    wherein said database further records temperature and volume caused by amounts, types and rotational speeds of different fans and heat-dissipation structures of different central processors.

2. The control device for fan state according to claim 1, wherein when said substrate is said independent substrate, said substrate is electrically connected with said motherboard.

3. The control device for fan state according to claim 2, wherein said temperature signal is detected by temperature detection software or by said motherboard detecting temperature of at least one central processor (CPU) and at least one graphics processing unit (GPU) on said motherboard.

4. The control device for fan state according to claim 2, wherein when said substrate is said independent substrate, said substrate is further provided with a power connector which is electrically connected with a power supply within said case through a power cable, and said power supply provides said substrate with power.

5. The control device for fan state according to claim 1, wherein said temperature signal is detected by temperature detection software or by said motherboard detecting temperature of at least one central processor (CPU) and at least one graphics processing unit (GPU) on said motherboard.

6. The control device for fan state according to claim 1, further comprising at least one expanded connector arranged on said substrate and connected with at least one light bar.

7. The control device for fan state according to claim 6, wherein said microcontroller switches on or off said at least one light bar according to said temperature signal.

8. The control device for fan state according to claim 1, wherein said substrate further comprises at least one audio connector which is connected with said at least one microphone.

9. The control device for fan state according to claim 1, wherein said at least one communication port is a USB 2.0 port, a USB 3.0 port or a micro USB port.

* * * * *